US006939615B2

(12) United States Patent
Tsutsui et al.

(10) Patent No.: US 6,939,615 B2
(45) Date of Patent: Sep. 6, 2005

(54) RESIN-METAL COMPOSITE STRUCTURE

(75) Inventors: Yoshiharu Tsutsui, Aichi (JP); Hisashi Mizuno, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 85 days.

(21) Appl. No.: 10/435,665

(22) Filed: May 12, 2003

(65) Prior Publication Data

US 2004/0229055 A1 Nov. 18, 2004

(30) Foreign Application Priority Data

May 14, 2002 (JP) ....................................... 2002-138554

(51) Int. Cl.[7] .......................... B32B 15/04; B32B 15/08

(52) U.S. Cl. ....................... 428/461; 428/457; 428/462; 428/465

(58) Field of Search ................................ 428/457, 461, 428/462, 465, 411.1, 423.1, 423.9, 425.8, 425.9, 492; 180/12, 13, 23; 74/552; 29/894, 894.011, 894.1

(56) References Cited

U.S. PATENT DOCUMENTS 4,505,984 A * 3/1985 Stelzer et al. ............ 428/424.7

FOREIGN PATENT DOCUMENTS

JP B2-H7-53857 6/1995

* cited by examiner

*Primary Examiner*—Sheeba Ahmed
(74) *Attorney, Agent, or Firm*—Posz Law Group, PLC

(57) ABSTRACT

A resin-metal composite structure having a resin molded part and a metal part integrated via a rubber adhesive layer, the resin molded part being a reactive injection molded part prepared from a polyurethane material comprising a polyol component and an isocyanate component, wherein the polyol component is a polyether polyol comprising a polyester polyol as an adhesion improver, and the polyester polyol is selected from a lactone-based polyol and an aliphatic saturated dicarboxylic acid-based polyol.

10 Claims, 1 Drawing Sheet

RESIN-METAL COMPOSITE STRUCTURE

FIELD OF THE INVENTION

This invention relates to a resin-metal composite structure having a resin molded part and a metal part integrated via a rubber adhesive layer. The resin-metal composite structure includes steering wheels, moldings, and bumpers of automobiles and other parts demanding high adhesive strength, particularly peel strength, between a metal part and a resin molded part.

BACKGROUND OF THE INVENTION

A steering wheel, a typical example of the resin-metal composite structures contemplated in the present invention, is generally produced by reactive injection molding (RIM) using a mold as shown in FIG. 1. A metal insert 1 is set on a lower mold 3, and the lower mold 3 is lifted and joined with an upper mold 5. A polyurethane material prepared by mixing a polyol component and an isocyanate component in a mixing head is injected into a cavity 7 formed in the closed mold to form a wheel main body 9 which is a resin molded part.

Adhesion between the wheel main body (resin molded part) 9 and the metal insert (metal part) 1 is usually secured by previously applying a rubber adhesive to the insert 1 to form an adhesive layer 2 as described in JP-B-7-53857.

SUMMARY OF THE INVENTION

Conventional techniques including the one disclosed in the above publication usually use a polyether polyol as the polyol component of the polyurethane material. However, further researches on the polyol component are needed to improve the adhesion between the resin molded part and the metal part.

An object of the present invention is to increase adhesion by improving the polyurethane material used to form the resin molded part.

As a result of extensive investigations, the present inventors have reached the resin-metal composite structure of the invention.

The present invention provides a resin-metal composite structure having a resin molded part and a metal part integrated via a rubber adhesive layer, the resin molded part being a reactive injection molded part prepared from a polyurethane material comprising a polyol component and an isocyanate component, wherein the polyol component is a polyether polyol containing a polyester polyol as an adhesion improver, and the polyester polyol is selected from a lactone-based polyol and an aliphatic saturated dicarboxylic acid-based polyol.

In a preferred embodiment of the invention, the polyol component is a mixture of the polyether polyol and the polyester polyol at a weight ratio of 100/0.5 to 100/15.

According to the present invention, an increased adhesive strength can be obtained between the resin molded part and the metal part of the resin-metal composite structure.

In a particularly preferred embodiment of the invention, the lactone-basedpolyol is a reaction product between neopentyl glycol and ϵ-caprolactone. In this embodiment, an increased adhesive strength can be secured without reducing the flowability of the polyurethane material.

DETAILED DESCRIPTION OF THE INVENTION

Figure 1:
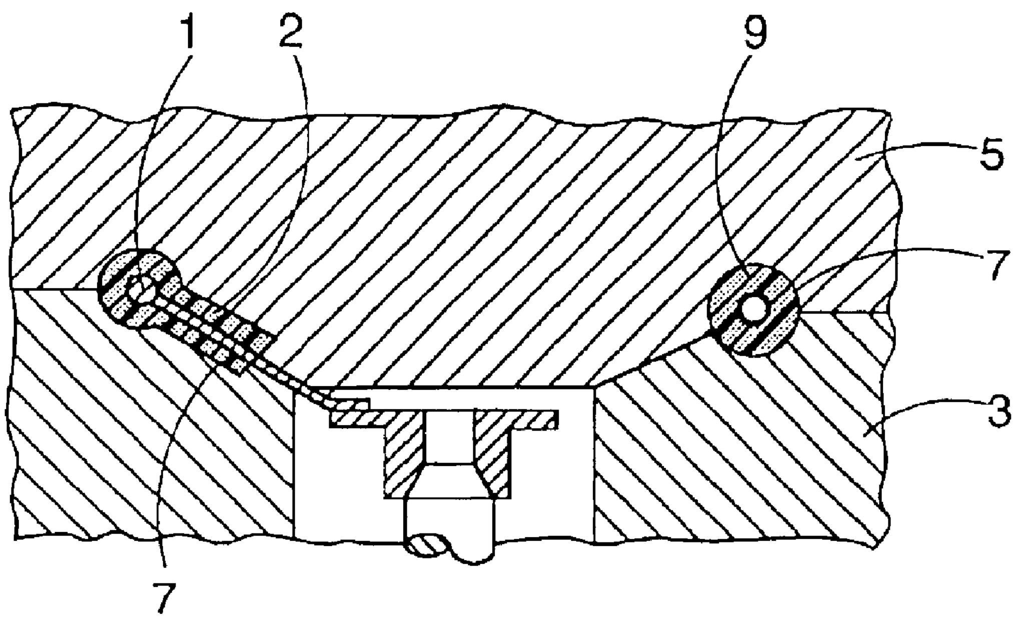
FIG. 1 is a cross-section of a mold for producing a steering wheel at the completion of molding.

The present invention will be described in detail with particular reference to a steering wheel. The description applies to the above-described other resin-metal composite structures. Unless otherwise noted, all the parts and percents are by weight.

The resin-metal composite structure of the invention is basically characterized in that the resin molded part and the metal part are integrally united via a rubber adhesive layer.

The metal part used in a steering wheel is generally made of steel materials, aluminum materials, magnesium materials, etc. The metal part is preferably subjected to pretreatment such as degreasing and blasting before applying a rubber adhesive.

Various rubber adhesives can be used, including chloroprene rubbers (CR), styrene-butadiene rubbers (SBR), acrylonitrile-butadiene rubbers (NBR), natural rubbers, and butyl rubbers. CRs are preferred from the standpoint of initial adhesion. It is desirable to add an isocyanate compound to the rubber adhesive for adhesion improvement.

The amount of the isocyanate compound to be added is usually 0.01 to 50 parts, preferably 0.5 to 20 parts, per 100 parts of the rubber component (polymer). The rubber adhesive generally contains appropriate additives, such as resins, fillers, plasticizers, antioxidants, vulcanizing agents, vulcanization accelerators, and organic solvents. If desired, a catalyst for reactive injection molding can be added.

The isocyanate compound that can be added to the rubber adhesive includes the following (a) aliphatic or (b) aromatic ones that are commonly employed in the polyurethane material and (c) silane isocyanates.

(a) Aliphatic Isocyanate

The term "aliphatic isocyanate" as used herein is intended to include not only aliphatic isocyanates but alicyclic ones. Examples are hexamethylene diisocyanate (HMDI), tetramethylene diisocyanate, hydrogenated xylylene diisocyanate, 4,4'-methylenebisdicyclohexyl diisocyanate (H12MDI), methylcyclohexyl diisocyanate (hydrogenated tolylene diisocyanate), and an isophorone diisocyanate (IPDI). Derivatives of these aliphatic isocyanate compounds intended to improve handling properties are also useful, such as dimers, trimers, trimethylolpropane adducts, and prepolymers.

(b) Aromatic Isocyanate

Examples include 4,4'-diphenylmethane diisocyanate (MDI), crude MDI (polymeric MDI), liquid MDI, tolylene diisocyanate (TDI), phenylene diusocyanate, 4,4',4"-triphenylmethane triisocyanate, xylylene diisocyanate (XDI), 4,4'-diphenyl ether diisocyanate, and 1,5-naphthalene diisocyanate. Derivatives of these aromatic isocyanate compounds intended to improve handling properties are also useful, such as dimers, trimers, trimethylolpropane adducts, and prepolymers.

(c) Silane Isocyanate

Examples are trimethylsilyl isocyanate, dimethylsilyl diisocyanate, methylsilyl triisocyanate, vinylsilyl triisocyanate, tetraisocyanatesilane, and ethoxysilane triisocyanate.

The rubber adhesive is applied to the metal part as diluted with an organic solvent to an appropriate viscosity and dried to form an adhesive layer. The organic solvent includes toluene, xylene, acetone, MEX, tetrahydrofuran, methylene chloride, trichloroethane, trichloroethylene, ethyl acetate, and methyl acetate. The method of application is not limited and includes dip coating, brush coating, and spraying.

The resin part of the resin-metal composite structure is formed by reactive injection molding using a polyurethane material comprising a polyol component and an isocyanate component.

The polyol component used in the invention is a polyether polyol having added thereto a polyester polyol as an adhesion improver.

The polyether polyol which can be used in the invention includes those prepared by ring-opening polymerization or copolymerization of cyclic ethers, such as ethylene oxide, propylene oxide, trimethylene oxide, butylene oxide, α-methyltrimethylene oxide, 3,3'-dimethyltrimethylene oxide, tetrahydrofuran, dioxane, and dioxamine.

The above-recited polyether polyols are usually used with a chain extender added thereto. A chain extender is effective in increasing the strength and impact resilience of a molded article and controlling on heat generation in the reaction system.

Useful chain extenders include ethylene glycol, diethylene glycol, and 1,4-butanediol. Ethylene glycol is usually added in an amount of 2 to 15 parts, desirably 3 to 10 parts, per 100 parts of the polyether polyol. Diethylene glycol or 1,4-butanediol is usually added in an amount of 3 to 25 parts, desirably 5 to 15 parts on the same basis. Where a chain extender is added in an excessive amount, the resulting molded resin part becomes too hard, and the reaction of the polyurethane material is accelerated to reduce the flowability of the injection material.

The polyester polyol is preferably selected from those having good compatibility with the above-recited polyether polyol. From this viewpoint, lactone-based polyols and aliphatic saturated dicarboxylic acid-based polyols are suitable.

Lactone-based polyols are prepared from lactones, such as β-propiolactone, γ-butyrolactone, δ-valerolactone, and ϵ-caprolactone, and polyols.

The polyols for preparing lactone-based polyols include diols, such as ethylene glycol, diethylene glycol, triethylene glycol, propylene glycol and butylene glycol; triols, such as trimethylolpropane, trimethylolethane, hexanetriol, and glycerol; and hexols, such as sorbitol. These polyols are combined with various lactones recited above to provide various lactone-based polyols.

The aliphatic saturated dicarboxylic acid-based polyols are prepared from aliphatic saturated dicarboxylic acids, such as oxalic acid, malonic acid, succinic acid, glutaric acid, adipic acid, pimelic acid, suberic acid, azelaic acid, sebacic acid, and isosebacic acid, and polyols.

The polyols for preparing the aliphatic saturated dicarboxylic acid-based polyols are the same as those described with respect to the lactone-based polyol preparation. These polyols are combined with various aliphatic saturated dicarboxylic acids enumerated above to provide various aliphatic saturated dicarboxylic acid-based polyols.

The combined use of the polyester polyol brings about improved adhesion between the resin molded part and the metal part. A catalyst-can be added to the polyol component. Other additives, such as foaming agents, antioxidants, and pigments, can also be added to the polyol component.

The polyether polyol and the polyester polyol are preferably used in a weight ratio of 100/0.5 to 100/15, particularly 100/1 to 100/10, especially 100/3 to 100/8. Use of too much polyester polyol results in reduced compatibility and is uneconomical in view of more expensiveness of the polyester polyol than the polyether polyol. Conversely, too less polyester polyol fails to manifest the improving effect on adhesion as expected in the invention.

Polyester polyols having a molecular weight of 500 to 2500 are suitable. Such polyester polyols include one prepared from adipic acid and 3-methyl-1,5-pentanediol (hydroxyl number: 57), one prepared from adipic acid and propylene glycol (hydroxyl number: 114), and one prepared from neopentyl glycol and ϵ-caprolactone (hydroxyl number: 57), which are used in Examples given infra.

In particular, a lactone-based polyol, especially one prepared from neopentyl glycol and ϵ-caprolactone makes it possible to improve the adhesion between the resin molded part and the metal part without causing reduction in material flowability.

The polyisocyanate component making up the polyurethane material includes those recited above as an isocyanate compound to be added to the rubber adhesive. Among them 4,4'-diphenylmethane diisocyanate (MDI) is particularly preferred.

The reactive injection molding using the polyurethane material is carried out under conditions of, for example, an injection speed of 100 to 300 g/sec, an injection pressure of 5 to 20 MPa, and a material temperature of 20 to 40° C.

According to the construction of the present invention, the adhesion between a resin molded part and a metal part of a resin-metal composite structure can be improved.

EXAMPLES

The present invention will now be illustrated in greater detail with reference to Examples, but it should be understood that the invention is not construed as being limited thereto.

Examples 1 TO 5 and Comparative Example

The polyester polyols used in Examples are shown in Table 1 below.

TABLE 1

| Polyester Polyol A (hydroxyl number) | Molecular Structure |
|---|---|
| A (57) | 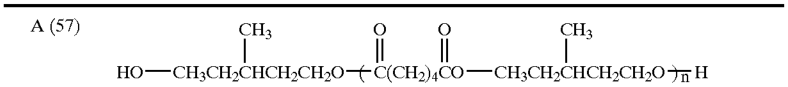 3-methyl-1,5-pentanediol/adipic acid/3-methyl-1,5-pentanediol |
| B (114) | 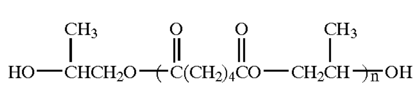 |

TABLE 1-continued

| Polyester Polyol A (hydroxyl number) | Molecular Structure |
| --- | --- |
| | propylene glycol/adipic acid/propylene glycol |
| C (57) | 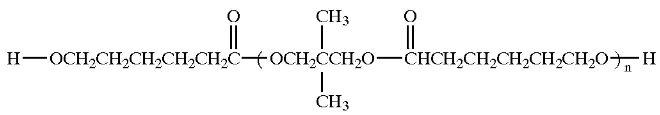 |
| | ε-caprolactone/neopentyl glycol/ε-caprolactone |

(1) Preparation of Test Piece (a) Preparation of Metal Part

A 2.5 cm wide, 15 cm long and 0.2 cm thick iron plate was degreased and coated with a rubber adhesive having the following formulation with a brush to form an adhesive layer having a dry thickness of 20 μm.

| Rubber adhesive formulation: | |
| --- | --- |
| CR polymer | 100 parts |
| Zinc oxide | 5 parts |
| Magnesia | 10 parts |
| Antioxidant | 2 parts |
| t-Butylphenol resin | 60 parts |
| toluene | 1003 parts |
| 4,4',4"-Triphenylmethane triisocyanate | 15 parts |

(b) Polyurethane Reaction Molding

The adhesive-coated iron plate was set on a plate mold (10×35.5×0.5 cm). A polyurethane material having the formulation shown in Table 2 was stirred and injected under the following conditions to prepare a test piece.

Amount of injection material: 200 g

Stirring machine:

RW-20DZM, supplied by Ikawerk, Germany

Stirring speed: 60 rpm

Stirring time: 10 seconds

Mold temperature: 55° C.

Curing time: 5 minutes (2) Evaluation

The resulting test piece was subjected to a 180° peeling test (tensile test) at room temperature to measure the peel strength (tensile speed: 50 mm/min). The results obtained are shown in Table 2 below.

TABLE 2

| | Example | | | | | Comp. |
| --- | --- | --- | --- | --- | --- | --- |
| | 1 | 2 | 3 | 4 | 5 | Example |
| Polyether polyol (hydroxyl number: 37) | 100 | 100 | 100 | 100 | 100 | 100 |
| Diethylene glycol | 23 | 23 | 23 | 23 | 23 | 23 |
| 33% Solution of triethylene-diamine (catalyst) in dipropylene glycol | 0.5 | 0.5 | 0.5 | 0.5 | 0.5 | 0.5 |
| Polyester polyol A | 5 | | | | | |
| Polyester polyol B | | 5 | | | | |
| Polyester polyol C | | | 1 | 5 | 10 | |
| Water | 0.15 | 0.15 | 0.15 | 0.15 | 0.15 | 0.15 |
| MDI (NCO: 28%) | 84 | 84 | 84 | 84 | 84 | 84 |
| Peel strength (N/m) | 2.5 | 3.2 | 3.1 | 3.3 | 6.2 | 2.1 |

It is seen from Table 2 that Examples using a polyester polyol exhibit higher adhesive strength than Comparative Example using no polyester polyol. The adhesive strength obtained in Examples 3 to 5 using a lactone-based polyester polyol is particularly high.

This application is based on Japanese Patent application JP 2002-138554, filed May 14, 2002, the entire content of which is hereby incorporated by reference, the same as if set forth at length.

What is claimed is:

1. A resin-metal composite structure having a resin molded part and a metal part integrated via a rubber adhesive layer, the resin molded part being a reactive injection molded part prepared from a polyurethane material comprising a polyol component and an isocyanate component, wherein the polyol component is a polyether polyol comprising a polyester polyol as an adhesion improver, and the polyester polyol is selected from the group consisting of a lactone-based polyol and an aliphatic saturated dicarboxylic acid-based polyol.

2. The resin-metal composite structure according to claim 1, wherein the polyester polyol has a molecular weight of from 500 to 2500.

3. The resin-metal composite structure according to claim 1, wherein the lactone-based polyol is a reaction product between neopentyl glycol and ε-caprolactone.

4. The resin-metal composite structure according to claim 1, wherein the polyol component comprises the polyether polyol and the polyester polyol at a weight ratio of 100/0.5 to 100/15.

5. The resin-metal composite structure according to claim 4, wherein the polyester polyol has a molecular weight of from 500 to 2500.

6. The resin-metal composite structure according to claim 4, wherein the lactone-based polyol is a reaction product between neopentyl glycol and ϵ-caprolactone.

7. The resin-metal composite structure according to claim 1, wherein the polyol component comprises the polyether polyol and the polyester polyol at a weight ratio of 100/1 to 100/10.

8. The resin-metal composite structure according to claim 7, wherein the polyester polyol has a molecular weight of from 500 to 2500.

9. The resin-metal composite structure according to claim 1, wherein the polyol component comprises the polyether polyol and the polyester polyol at a weight ratio of 100/3 to 100/8.

10. The resin-metal composite structure according to claim 9, wherein the polyester polyol has a molecular weight of from 500 to 2500.

* * * * *